(12) United States Patent
Choi et al.

(10) Patent No.: US 9,526,044 B2
(45) Date of Patent: Dec. 20, 2016

(54) METHOD OF CONFIGURING DUAL CONNECTIVITY TO UE IN HETEROGENEOUS CELL DEPLOYMENT

(71) Applicant: LG ELECTRONICS INC., Seoul (KR)

(72) Inventors: Hyeyoung Choi, Seoul (KR); Jaehoon Chung, Seoul (KR); Ilmu Byun, Seoul (KR); Eunjong Lee, Seoul (KR); Heejeong Cho, Seoul (KR); Genebeck Hann, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/273,089

(22) Filed: May 8, 2014

(65) Prior Publication Data

US 2014/0335869 A1 Nov. 13, 2014

Related U.S. Application Data

(60) Provisional application No. 61/820,710, filed on May 8, 2013.

(51) Int. Cl.
| | | |
|---|---|---|
| H04W 36/00 | (2009.01) |
| H04B 7/00 | (2006.01) |
| H04M 3/00 | (2006.01) |
| H04W 4/00 | (2009.01) |
| H04L 12/26 | (2006.01) |
| H04B 7/216 | (2006.01) |
| H04W 40/36 | (2009.01) |
| H04W 76/02 | (2009.01) |

(52) U.S. Cl.
CPC ......... *H04W 36/0072* (2013.01); *H04W 40/36* (2013.01); *H04W 76/025* (2013.01)

(58) Field of Classification Search
CPC ...... H04L 1/00; H04W 36/0072; H04W 40/36
See application file for complete search history.

(56) References Cited

U.S. PATENT DOCUMENTS

| | | | |
|---|---|---|---|
| 2001/0036823 A1* | 11/2001 | Van Lieshout et al. ...... 455/418 |
| 2012/0046058 A1* | 2/2012 | Vesterinen et al. ........... 455/509 |
| 2013/0044708 A1* | 2/2013 | Kim et al. .................... 370/329 |
| 2015/0245402 A1* | 8/2015 | Mochizuki ............ H04W 36/22 370/331 |
| 2015/0282239 A1* | 10/2015 | Han .................... H04W 76/025 370/329 |

\* cited by examiner

*Primary Examiner* — Frantz Bataille
(74) *Attorney, Agent, or Firm* — Birch, Stewart, Kolasch & Birch, LLP

(57) ABSTRACT

A method and a macro cell eNB are disclosed. The method includes receiving a measurement report message of the small cell from the UE connected to the macro cell, determining to configure dual connectivity with the macro cell and the small cell to the UE based on a measured value contained in the measurement report message, transmitting a dual connectivity request message for requesting connection with the UE to the small cell, receiving a dual connectivity response message indicating that the small cell is connected to the UE to determine to allocate a resource to the UE, from the small cell, and transmitting an RRC configuration message for requesting addition of connection with the small cell, to the UE.

16 Claims, 19 Drawing Sheets

MeNB : macro eNode B    MUE : macro UE
PeNB : pico eNodeB      PUE : pico UE
FeNB : femto eNode B    FUE : femto UE MeNB : macro eNode B  MUE : macro UE
PeNB : pico eNodeB  PUE : pico UE
FeNB : femto eNode B  FUE : femto UE

———▶ DESIRED SIGNAL    – – – ▶ INTERFERENCE SIGNAL

FIG. 7
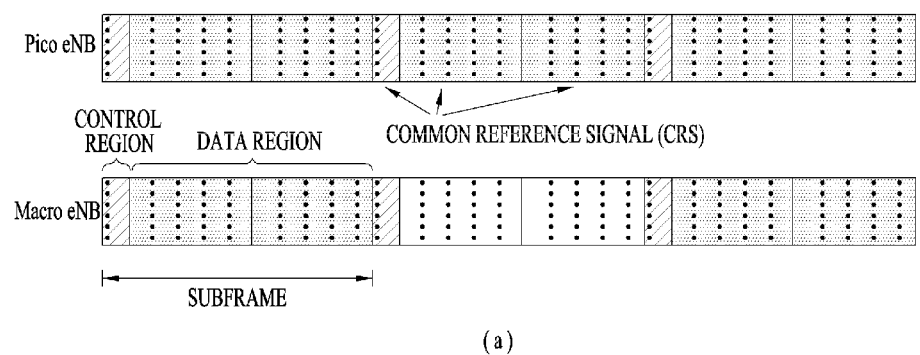
(a)
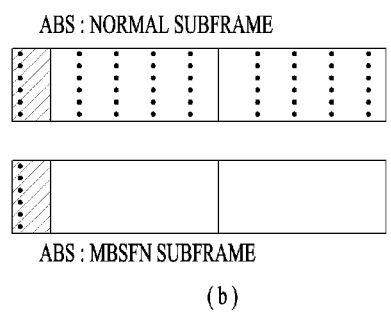
(b)

METHOD OF CONFIGURING DUAL CONNECTIVITY TO UE IN HETEROGENEOUS CELL DEPLOYMENT

Pursuant to 35 U.S.C. §119(e), this application claims the benefit of U.S. Provisional Application No. 61/820,710, filed on May 8, 2013 which is hereby incorporated by reference as if fully set forth herein.

BACKGROUND OF THE INVENTION

Field of the Invention

The present invention relates to a method of configuring dual connectivity to a macro cell and a small cell to a user equipment (UE) in a heterogeneous cell deployment in which the macro cell and the small cell coexist.

Discussion of the Related Art

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network.

It is inefficient to additionally install a macro cell eNB in a complex urban environment like in a conventional art. This is because system throughput enhancement is not high compared with increase in costs and complexity for additional installment of macro cells due to shadow areas of a communication environment. Accordingly, in a new heterogeneous cell structure, a plurality of small cells coexists in a macro cell and serves corresponding UEs by resource allocation based on cell coordination. The heterogeneous cell structure is used to enhance quality of experience (QoE) by providing a high data transmission rate to a last user.

In small cell enhancements for E-UTRA and E-UTRAN study item (SI) as one of $3^{rd}$ generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conduced to draw advantages of concept of dual connectivity to small cell layers and a macro cell layer in which a user uses the same or different carriers.

SUMMARY OF THE INVENTION

Accordingly, the present invention is directed to a method of configuring dual connectivity to a user equipment (UE) in a heterogeneous cell deployment substantially obviates one or more problems due to limitations and disadvantages of the related art.

An object of the present invention is to provide a method of configuring dual connectivity to a UE in a heterogeneous cell deployment in which a macro cell and a small cell coexist.

Another object of the present invention is to provide a method of reducing interference to an uplink (UL) signal from the UE as well as a method of reducing interference to a downlink (DL) signal to the UE.

Another object of the present invention is to provide a method of configuring dual connectivity to a UE in various network deployments by configuring dual connectivity of a UE by a subject such as a macro cell, a small cell, a macro UE, a small UE, etc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of configuring dual connectivity to a user equipment (UE) by a macro cell in a heterogeneous cell deployment in which a macro cell and a small cell coexist includes receiving a measurement report message of the small cell from the UE connected to the macro cell, determining to configure dual connectivity with the macro cell and the small cell to the UE based on a measured value contained in the measurement report message, transmitting a dual connectivity request message for requesting connection with the UE to the small cell, receiving a dual connectivity response message indicating that the small cell is connected to the UE to determine to allocate a resource to the UE, from the small cell; and transmitting an RRC configuration message for requesting addition of connection with the small cell, to the UE.

The method may further include transmitting a dual connectivity complete message for requesting establishment of a data radio bearer (DRB) with the UE when the UE completes synchronization with the small cell, to the small cell.

The method may further include transmitting a path switch request message for requesting modification of a bearer to the UE to a mobility management entity (MME) for supporting the small cell according to switching of a user plane (U-plane) of the UE when the UE completes synchronization with the small cell.

The path switching request message may be transmitted to a serving gateway (S-GW) from the MME, and the S-GW may establish an S1 downlink bearer with the small cell.

A user plane (U-plane) of the UE may be switched to the small cell from the macro cell or is newly generated according to a relation with the small cell when the dual connectivity is configured to the UE.

The determining may include determining the dual connectivity based on at least one of intensity of a signal received from the small cell, reference signal received power (RSRP), reference signal received quality (RSRQ), and a signal to interference plus noise ratio (SINR).

The dual connectivity request message may include at least one of information about a first resource that the small cell should avoid in scheduling the UE, and information about a second resource that the small cell can allocate in scheduling the UE.

The information about the first resource may be information about a resource allocated to another UE having dual connectivity to the macro cell and the small cell by the small cell.

The dual connectivity request message may include at least one of context information of the UE, a dedicated preamble that the UE is supposed to transmission to the small cell, and an indicator indicating switching of the U-plane.

In another aspect of the present invention, a macro cell eNB for configuring dual connectivity to a user equipment (UE) in a heterogeneous cell deployment in which a macro cell and a small cell coexist includes a transmitter, a receiver, and a processor connected to the transmitter and the receiver to configure dual connectivity to the UE, wherein the processor controls the receiver to receive a measurement report message of the small cell from the UE connected to the macro cell, controls the transmitter to determine to configure dual connectivity with the macro cell and the small cell to the UE based on a measured value contained in the measurement report message and to transmit a dual connectivity request message for requesting connection with the UE to the small cell, controls the receiver to receive a dual connectivity response message indicating that the small cell is connected to the UE to determine to allocate a resource to the UE, from the small cell, and controls the transmitter to transmit an RRC configuration message for requesting addition of connection with the small cell, to the UE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for explanation of an ABS according to an embodiment of the present invention;

DETAILED DESCRIPTION OF THE INVENTION

Figure 1:
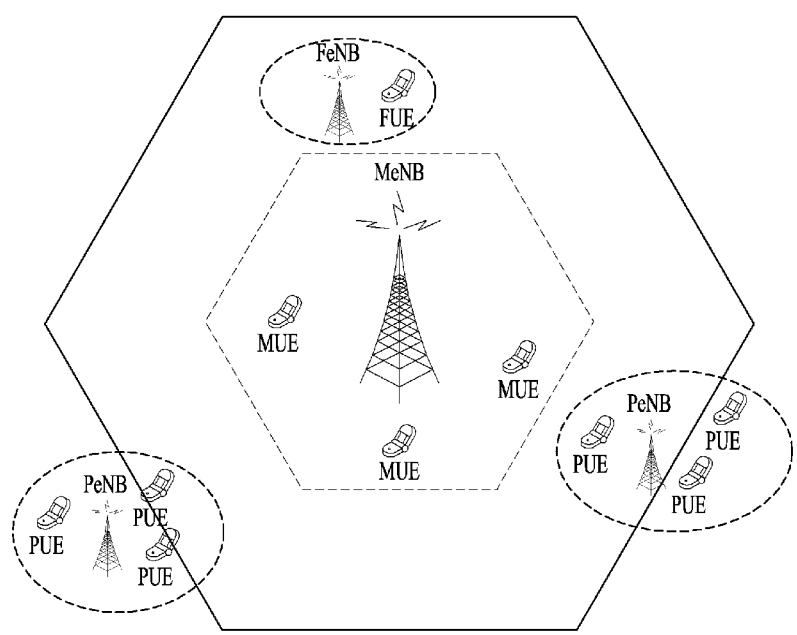
FIG. 1 illustrates a heterogeneous network wireless deployment according to the present invention.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

In addition, the expression that a device communicates with a 'cell' means that the device transmits and receives signals to and from an eNB of the corresponding cell. That is, an actual object to and from which the device transmits and receives signals may be a specific eNB. However, for convenience of description, the device transmits and receives signals to and from a cell formed by the specific cell. Similarly, the terms 'macro cell' and/or 'small cell' may refer to corresponding specific coverage and also refer to 'an eNB for supporting a macro cell' and/or 'a small cell eNB for supporting a small cell'.

The embodiments of the present invention are supported by standard documents disclosed in at least one of the Institute of Electrical and Electronic Engineers (IEEE) 802.xx system, the $3^{rd}$ generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Deployment

FIG. 1 illustrates a heterogeneous network wireless deployment according to the present invention.

To guarantee a more stable data service such as multimedia service in future-generation mobile communication, much attention has been attracted to a hierarchical cell structure or heterogeneous cell structure in which micro cells (pico cells or femto cells) are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each serve corresponding UEs by resource allocation based on cell coordination.

The above small cells are categorized into two types depending on their access schemes of UEs. First, small cells using open access subscriber group (OSG) or non closed subscriber group (Non-CSG) scheme are accessible to UEs connected to a macro cell and/or UEs connected to other small cells. The OSG or Non-CSG scheme enables handover to the small cells from other cells.

Second, small cells using a closed subscriber group (CSG) scheme are not accessible to unauthorized UEs connected to a macro cell and/or unauthorized UEs connected to other small cells. In addition, the CSG scheme does not allow handover to the small cells from other cells.

2. Carrier Aggregation and Dual Connectivity

Figure 2:
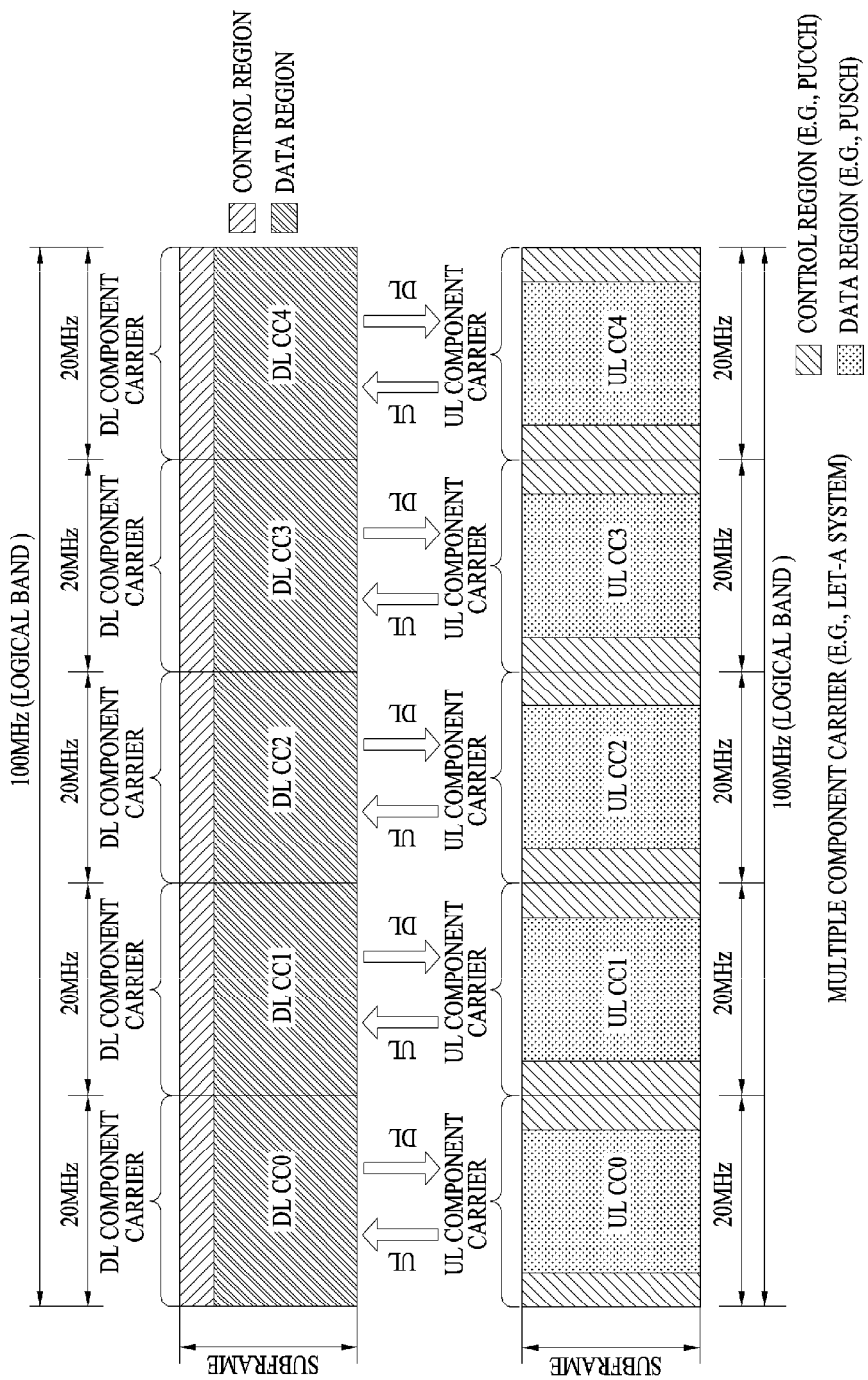
FIG. 2 is a diagram illustrating carrier aggregation according to the present invention.

FIG. 2 is a diagram illustrating carrier aggregation according to the present invention.

Referring to FIG. 2, a communication system may collect a plurality of uplink/downlink component carriers (CCs) to support wider uplink/downlink bandwidths. The term "CC" may be replaced with other equivalent terms (e.g., a carrier, a cell, etc.). CCs may or may not be adjacent to each other in the frequency domain. A bandwidth of CCs may be independently determined. Asymmetrical carrier aggregation with UL CCs and DL CCs, the numbers of which are different, is possible. Control information may be configured to be transmitted and received through a specific CC. The specific CC may be referred to as a primary CC (or an anchor CC) and the remaining CCs may be referred to as a secondary CC.

When cross-carrier scheduling (or cross-CC scheduling) is applied, PDCCH for downlink allocation may be transmitted to DL CC#0, and the corresponding PDSCH may be transmitted to DL CC#2. Moreover, for cross-CC scheduling of LTE-advanced (LTE-A) UEs, the introduction of carrier indicator field (CIF) has been considered. Configuration for the presence or absence of the CIF within PDCCH is semi-statically and UE-specifically (UE-group-specifically) enabled by higher layer signaling (e.g., RRC signaling). The baseline of PDCCH transmission is summarized as below.

1) CIF disabled: PDCCH on a DL CC assigns PDSCH resources on the same DL CC or PUSCH resources on a single linked UL CC 1-1) No CIF 1-2) The same as Rel-8 PDCCH structure (the same coding and the same CCE-based resource mapping) and DCI formats 2) CIF enabled: PDCCH on a DL CC can assign PDSCH or PUSCH resources in one of multiple aggregated DL/UL CCs using the CIF 2-1) LTE DCI format extended with the CIF 2-1-1) CIF (if configured) is a fixed x-bit field (e.g., x=3)

2-1-2) CIF (if configured) location is fixed irrespective of DCI format size 2-2) Reusing LTE PDCCH structure (the same coding and the same CCE-based resource mapping)

Figure 3:
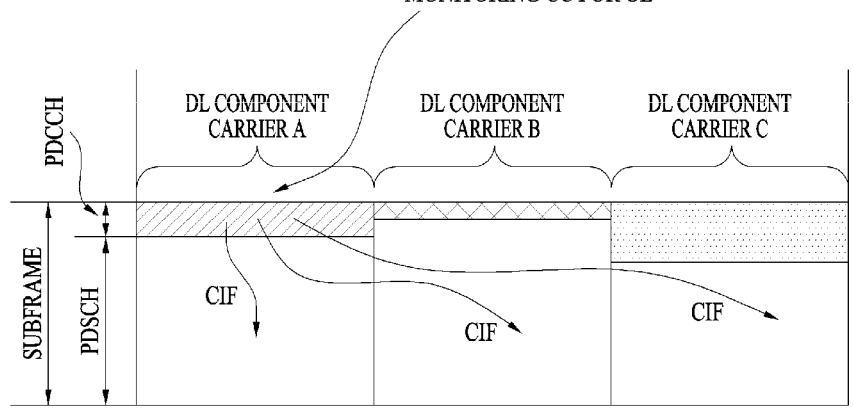
FIG. 3 is a diagram illustrating cross scheduling in the case of aggregation of a plurality of carriers according to the present invention.

FIG. 3 is a diagram illustrating cross scheduling in the case of aggregation of a plurality of carriers according to the present invention.

In the case of presence of CIF, the eNB may assign the PDCCH monitoring DL CC set for reduction of blind decoding complexity at the UE side. The PDCCH monitoring DL CC set is a portion of the entire aggregated DL CCs and includes one or more DL CC, and the UE only performs detection/decoding of PDCCHs on the corresponding DL CC. In other words, upon scheduling PDSCH/PUSCH for a UE, the eNB transmits PDCCHs only through the PDCCH monitoring DL CC set. The PDCCH monitoring DL CC set may be set UE-specifically, UE-group-specifically, or cell-specifically. The term "PDCCH monitoring DL CC" may be replaced with the equivalent terms such as a monitoring carrier, a monitoring cell, etc. In addition, CCs aggregated for the UE may be replaced with the equivalent terms such as a serving CC, a serving carrier, a serving cell, etc.

As illustrated in FIG. 3, three DL CCs may be aggregated. In FIG. 3, DL CC A is configured as the PDCCH monitoring DL CC. DL CC A, B, and C may each be referred to as a serving CC, a serving carrier, a serving cell, etc. When the CIF is disabled, each DL CC can transmit only the PDCCH scheduling its own PDSCH without the CIF according to LTE PDCCH configuration. On the other hand, when the CIF is enabled by UE-specific (or UE-group-specific or cell-specific) higher layer signaling, only DL CC A (monitoring DL CC) can transmit the PDCCHs scheduling not only its own PDSCH but also PDSCHs of the other CCs using the CIF. In this case, no PDCCH is transmitted on DL CC B and C which are not configured as the PDCCH monitoring DL CC. Accordingly, DL CC A (monitoring DL CC) needs to include all of a PDCCH search range associated with DL CC A, a PDCCH search range associated with DL CC B, and a PDCCH search range associated with DL CC C. In this specification, it is assumed that the PDCCH search ranges are defined for the respective carriers.

As described above, LTE-A has considered the introduction of CIF for cross-CC scheduling. Whether the CIF is used (that is, whether a cross-CC scheduling mode or a non-cross-CC scheduling mode is supported) and conversion between modes may be configured via RRC signaling semi-statically/UE-specifically. The UE may perform the RRC signaling and then check whether the CIF is used in PDCCH scheduled to the UE.

Figure 4:
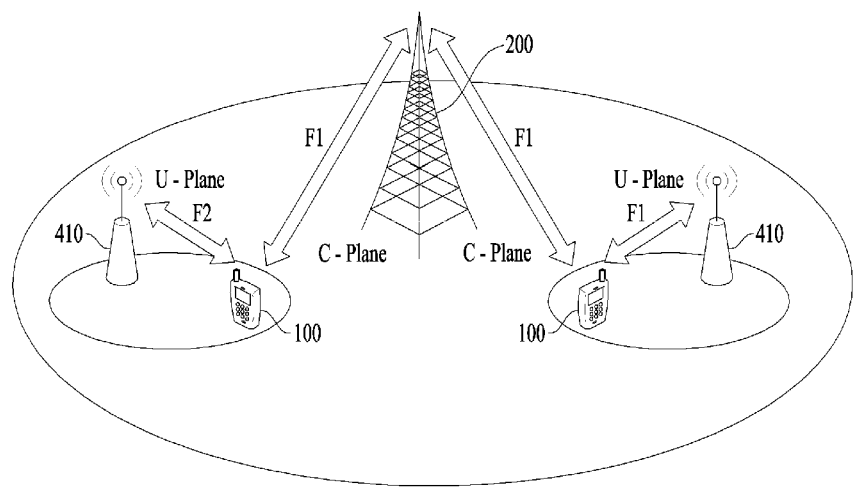
FIG. 4 is a diagram for explanation of dual connectivity according to the present invention.

FIG. 4 is a diagram for explanation of dual connectivity according to the present invention.

A UE 100 within the coverage of first and second small-cell eNBs 410 and 420 may be connected simultaneously to a small cell and a macro cell by a macro-cell eN B 200. The UE 100 may receive a service from a macro cell or a small cell simultaneously or in a time division multiplying (TDM) scheme. Backhaul between the macro cell and the small cell may be ideal backhaul or non-ideal backhaul.

The UE 100 may receive a service of control plane (C-plane) functionalities (connection management and mobility) through a macro cell layer. In addition, the UE 100 may select user plane (U-plane) functionalities from the macro cell and/or the small cell and receive a service of the U-plane functionalities. FIG. 4 illustrates an embodiment in which a small cell is a data path of the U-plane.

For example, data may be transmitted in real time by a service such as voice over long term evolution (VoLTE). When the UE 100 moves and receives from the VoLTE service from a small cell, interruption of the service may occur frequently. Thus, the UE 100 may receive a service from a macro cell in which continuity is ensured relative to a small cell. On the other hand, the UE 100 may receive a service that requires high efficiency from a small cell.

The macro cell and the small cell may perform carrier aggregation. That is, the macro cell and the small cell may user the respective random n and k (n and k are natural numbers) carriers. In this case, carriers of the macro cell and small cell may be different or some carriers may be commonly used by the macro cell and small cell. For example, the macro cell may use subcarriers with frequencies f1 and f2 and the small cell may use subcarriers with frequencies f2 and f3.

Referring to FIG. 4, the macro-cell eNB 200 and the first small-cell eNB 410 may uses subcarriers with different frequencies F1 and F2. On the other hand, the macro-cell eNB 200 and the second small-cell eNB 420 may use the same frequency band F1 in order to provide a service to the UE 100. The UE 100 configured to have dual connectivity may be simultaneously connected to both a macro cell by the macro-cell eNB 200 and a small cell by the small-cell eNBs 410 and 420.

A detailed description will be given in such a way that the aforementioned dual connectivity is similar to inter-site (or inter-band) carrier aggregation for aggregating carriers in different bands. That is, the detailed description will be given in such a way that a macro cell is a primary cell (PCell) by a primary CCE in carrier aggregation and a small cell is a secondary cell (SCell) by a secondary CC in carrier aggregation.

However, dual connectivity in a heterogeneous network deployment needs to be distinguished from carrier aggregation. That is, dual connectivity between a macro cell and a small cell is interpreted as adding geographical/positional concept, but not carrier aggregation in a single eNB. In more detail, when the UE 100 is positioned in a small cell by the first small-cell eNB 410 or positioned in a small cell by the second small-cell eNB 420, the UE 100 may simultaneously communicate with the first and second small-cell eNBs 410 and 420 that are geographically/positionally separated while receiving a service from the macro-cell eNB 200.

The legacy LTE (Rel-8/9) and LTE-A considers carrier aggregation in order to configure PCell and SCell(s) for one UE by an eNB. The PCell and SCell configured to the UE via carrier aggregation are scheduled by the same scheduler.

However, when a UE has dual connectivity in the aforementioned heterogeneous network deployment (that is, when the UE is simultaneously connected to both a macro cell and a small cell), the UE may be independently scheduled with respect to the macro cell and the small cell from separate schedulers. That is, the UE may be scheduled with the PCell from the macro cell and scheduled with the SCell from the small cell.

The UE having dual connectivity may be allocated resources from different network points (e.g., a master eNB and a secondary eNB) connected via non-ideal backhaul. In this case, the master eNB (MeNB) may function as a mobility anchor to an eNB corresponding to S1-MME connection from a core network (CN) in dual connectivity. A group of serving cells associated with the master eNB may be defined as a master cell group. A secondary eNB (SeNB) is an eNB for providing additional resources for a UE and may be defined to be distinguished from a master eNB (i.e., the SeNB may be defined as an eNB that is not the master eNB). In addition, similarly to a master cell group, a group of serving cells associated with the SeNB may be defined as a secondary cell group.

In this specification, the UE having dual connectivity may receive a service from a PCell via connection with a macro cell and may receive a service from a SCell via connection with a small cell. That is, in this specification, an operation performed on the "PCell" may refer to an operation performed on a "macro cell" that serves the PCell, and an operation performed on the "SCell" may refer to an operation performed on a "small cell" that serves the SCell.

However, the terms are selected for convenience of description only. That is, terms "PCell" and "SCell" may be interpreted as various meanings according to a cell type and are not limited to the aforementioned meanings. For example, the "PCell" and the "SCell" may refer to a macro cell and a small cell, respectively and also refer to the "master eNB)" and the "secondary eNB", respectively. In addition, the "PCell" and the "SCell" may refer to the "master cell group" associated with the MeNB and the "secondary cell group" associated with the SeNB, respectively.

3. Method of Configuring of Dual Connectivity of UE

Figure 5:
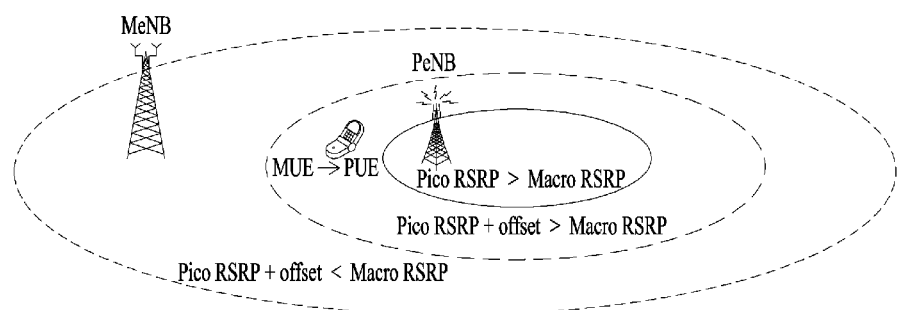
FIG. 5 is a diagram for explanation of cell range extension (CRE) according to the present invention.

FIG. 5 is a diagram for explanation of cell range extension (CRE) according to the present invention.

In a heterogeneous network configuration, there may be a UE positioned adjacent to a small eNB (e.g., pico eNB (PeNB)) among macro UEs (MUEs) connected to a macro eNB, MeNB). The CRE refers to a technology for handover of a UE that is positioned adjacent to a small eNB among macro UEs and receives predetermined interference or more from a small eNB to the corresponding small eNB. Via the CRE, influence of interference may be reduced to achieve load balancing between eNBs.

If a serving cell is determined simply by comparing single measurement values such as reference signal received powers (RSRPs), the probability that the RSRP from an MeNB having high transmission power is higher than the RSRP from a PeNB having low transmission is high. Thus, the UE performs handover with difficulty to a small eNB. A predetermined offset value for smooth performance of CRE technology may be used according to Equation 1 below.

$$\text{Pico RSRP+offset>Macro RSRP} \qquad \text{[Equation 1]}$$

In Equation 1 above, offset is a value set for a UE by higher-layer signaling. With the offset, the UE may perform CRE to a PeNB having low transmission power.

Figure 6:
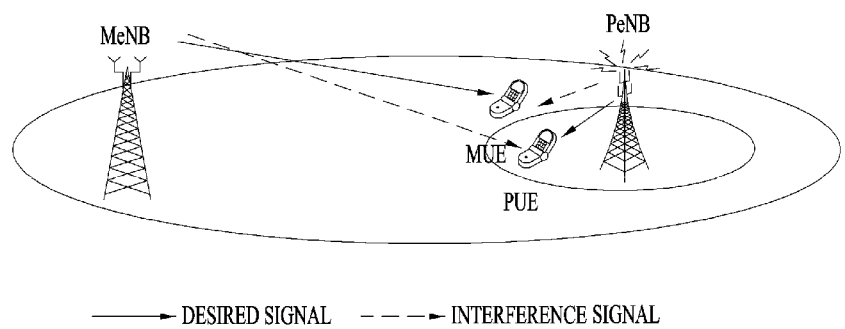
FIG. 6 is a diagram for explanation of an almost blank subframe (ABS) according to an embodiment of the present invention.

FIGS. 6 and 7 are diagrams for explanation of an almost blank subframe (ABS) according to the present invention.

ABS refers to a technology of configuring a time period during which data or a control signal is not transmitted in a specific subframe, for the purpose of interference reduction in a heterogeneous network structure. In addition, ABS refers to a technology of scheduling a UE for the purpose of interference reduction of UEs by forming patterns in subframe units and sharing information about patterns between eNBs.

FIG. 6 is a diagram illustrating an example of interference influence of downlink (DL) deployment in a heterogeneous network configuration. As illustrated in FIG. 6, a macro UE positioned outside a PeNB may be seriously interfered by the PeNB. In this case, the corresponding macro UE may perform handover to the PeNB via the aforementioned CRE but may still be interfered by the MeNB. The PUE that receives a service from the PeNB may also be interfered by the MeNB and may detect desired signals with difficulty.

In order to overcome this problem, the MeNB may empty a subframe in which interference occurs in order to prevent interference with respect to wireless resource used by a user outside the PeNB. That is, as illustrated in FIG. 7(a), an ABS makes a period in which the MeNB does not transmit data and exchanges information about the period between eNBs. Thus, the PeNB may schedule UEs positioned outside coverage of the PeNB using a corresponding subframe to prevent interference.

There are two types of ABSs illustrated in FIG. 7(b). When an ABS is a normal subframe, a common reference signal (CRS) is still transmitted in an empty subframe, and thus, interference due to the CRS may still occur in a UE. On the other hand, if an ABS is a multicast broadcast over a single frequency network (MBSFN) subframe, a CRS is not transmitted in a data region. In this case, no interference due to the CRS may occur. However, since the use of an MBSFN subframe is limited, it is preferred that an eNB generates an ABS pattern in consideration of the characteristics of the normal subframe and the MBSFN subframe.

The description given with reference to FIGS. 6 and 7 can also be applied to an uplink (UL) deployment.

Figure 8:
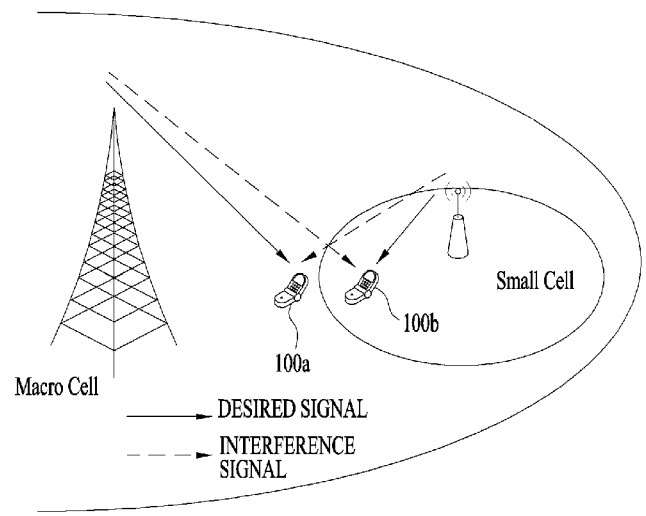
FIG. 8 is a diagram illustrating a DL interference situation with respect to a UE according to the present invention.

FIG. 8 is a diagram illustrating a DL interference situation with respect to a UE according to the present invention.

In a heterogeneous network deployment situation in which a macro cell and a small cell coexist, the macro cell and the small cell may allocate the same frequency band to the UE. In this case, as illustrated in FIG. 8, interference may occur between a macro UE (a UE using a macro cell as a serving cell, 100a) and a small UE (a UE using a small cell as a serving cell (e.g., a pico UE (PUE) or a femto UE (FUE)), 100b).

When the macro cell and the small cell use the same frequency band, the macro UE 100a adjacent to the small cell may be affected by a DL interference signal from the small cell. In addition, the small UE 100b allocated the same resource as the resource allocated to the macro UE 100a may also be affected by the DL interference signal from the macro cell.

In the legacy LTE (Rel-8/9), the CRE has been proposed, which connects macro UEs to a small cell in order to reduce DL interference to macro UEs adjacent to the small cell from the small cell and perform data offloading. However, since the CRE is performed by controlling cell-specific handover parameters, even a macro UE that is not affected by interference from the small cell is connected to the small cell. In this case, all macro UEs adjacent to the small cell are connected to a small cell with low DL signal intensity, and thus, DL performance of macro UEs is degraded.

Figure 9:
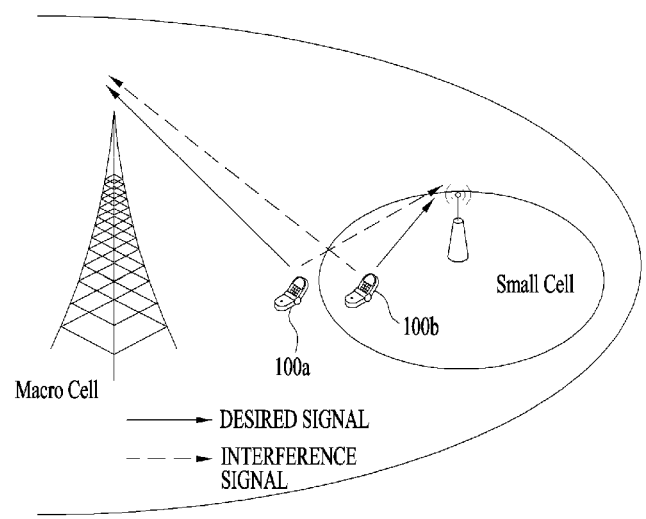
FIG. 9 is a diagram illustrating a UL interference situation with respect to a UE according to an embodiment of the present invention.

FIG. 9 is a diagram illustrating a UL interference situation with respect to a UE according to an embodiment of the present invention.

FIG. 9 illustrates a UL interference situation, which is opposite to the case of FIG. 8. In the heterogeneous network deployment, interference may occur between UL of the macro UE 100a and UL of the small UE 100b. That is, a macro cell is affected by interference from a UL signal of the small UE 100b, which is received together with desired signals, and a small cell is affected by interference of a UL signal of the macro UE 100a.

Hereinafter, a method of removing interference UE-specifically via a process of configuring dual connectivity to a UE will be described. In this specification, the UE configures dual connectivity to a macro cell and a small cell. However, this is for convenience of description. That is, the dual connectivity of the UE is not limited to a cell type (a macro cell, a micro cell, a pico cell, a femto cell, etc.).

Figure 10:
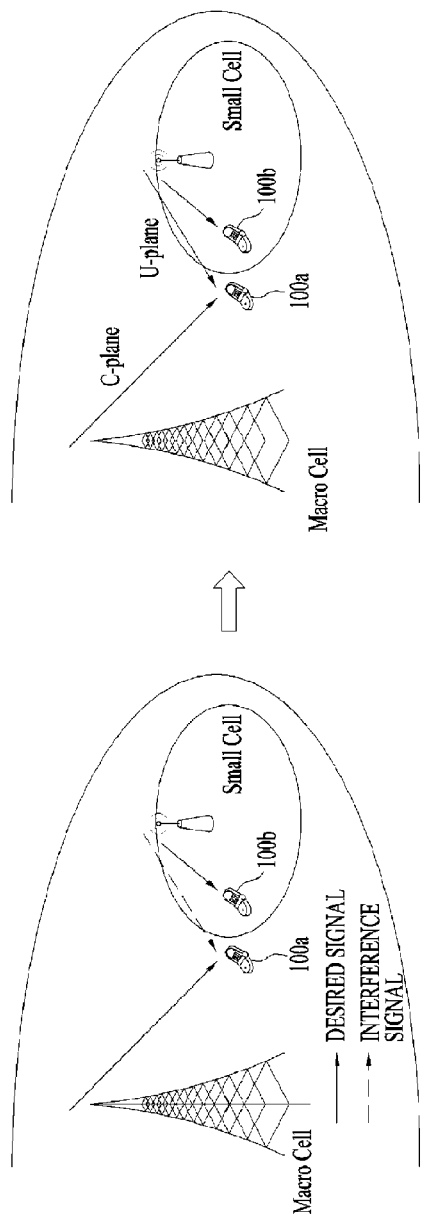
FIG. 10 is a diagram illustrating a process in which dual connectivity is configured to a UE according to an embodiment of the present invention.
Figure 11:
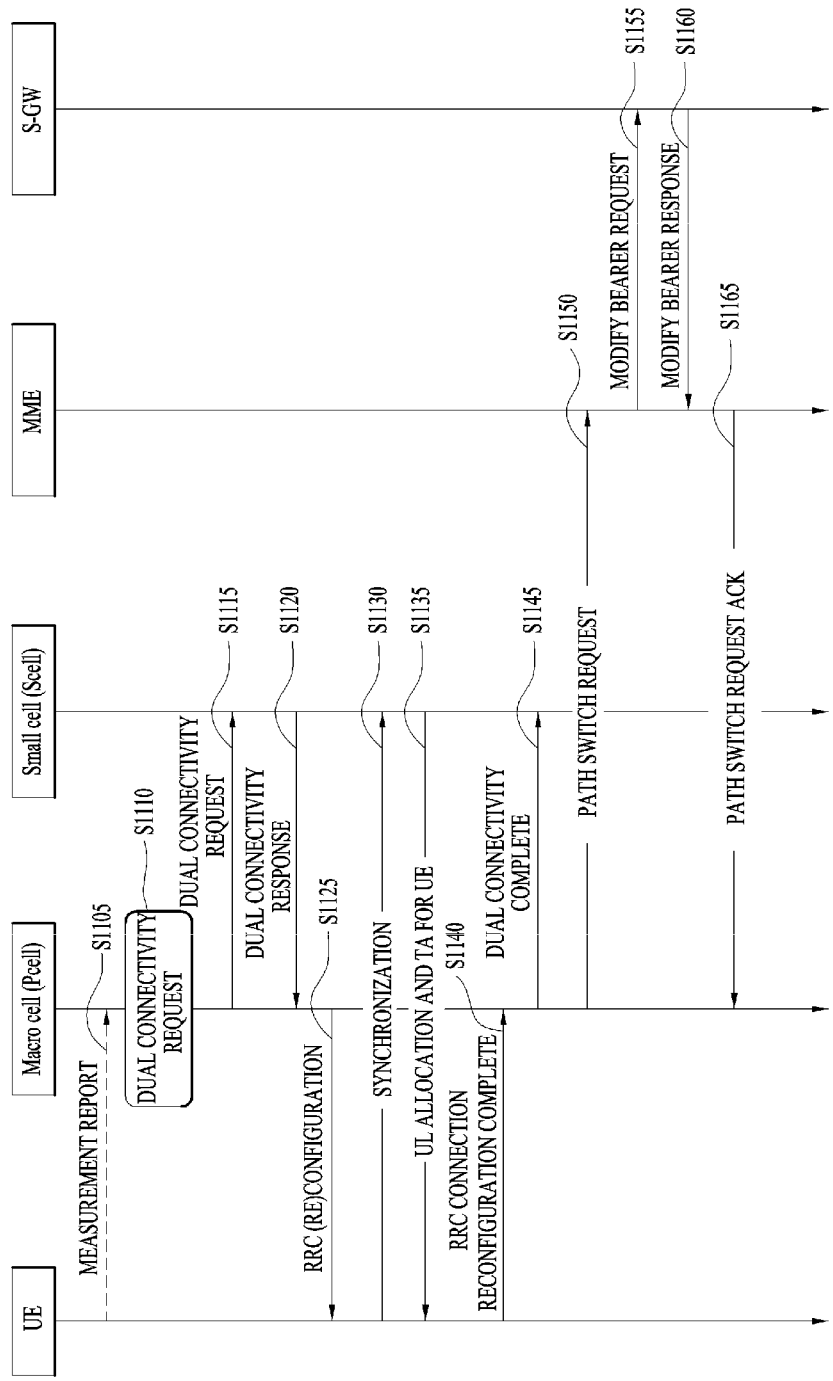
FIG. 11 is a diagram illustrating a procedure of configuring dual connectivity to a UE according to another embodiment of the present invention.
Figure 12:
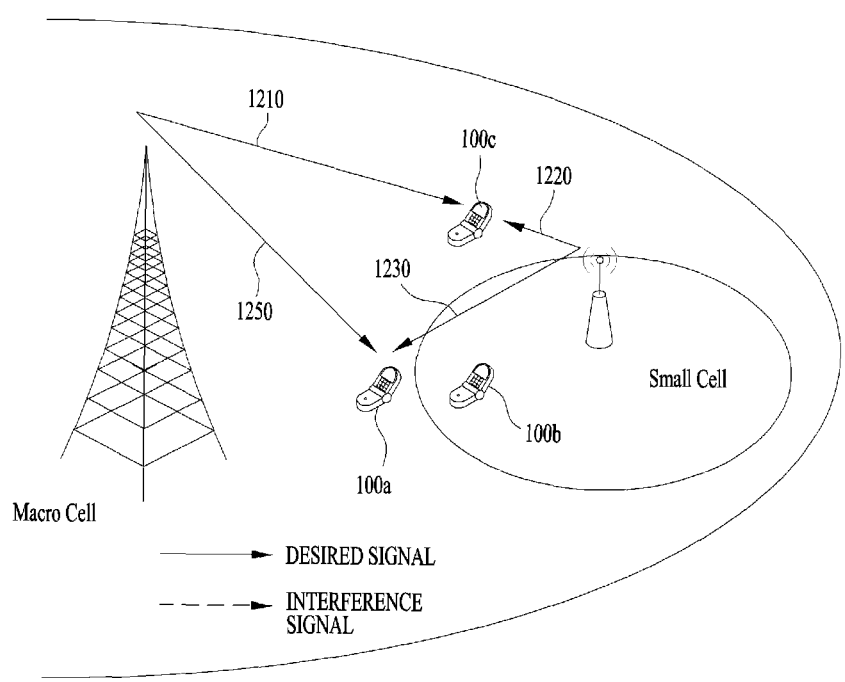
FIG. 12 is a flowchart of a procedure of configuring dual connectivity to a UE according to another embodiment of the present invention.
Figure 13:
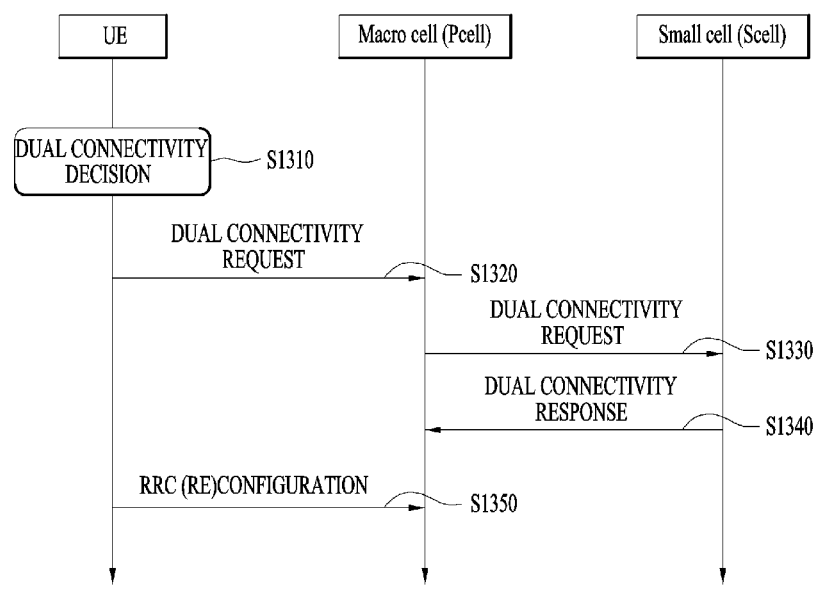
FIG. 13 is a flowchart of a procedure of configuring dual connectivity to a UE according to another embodiment of the present invention.
Figure 14:
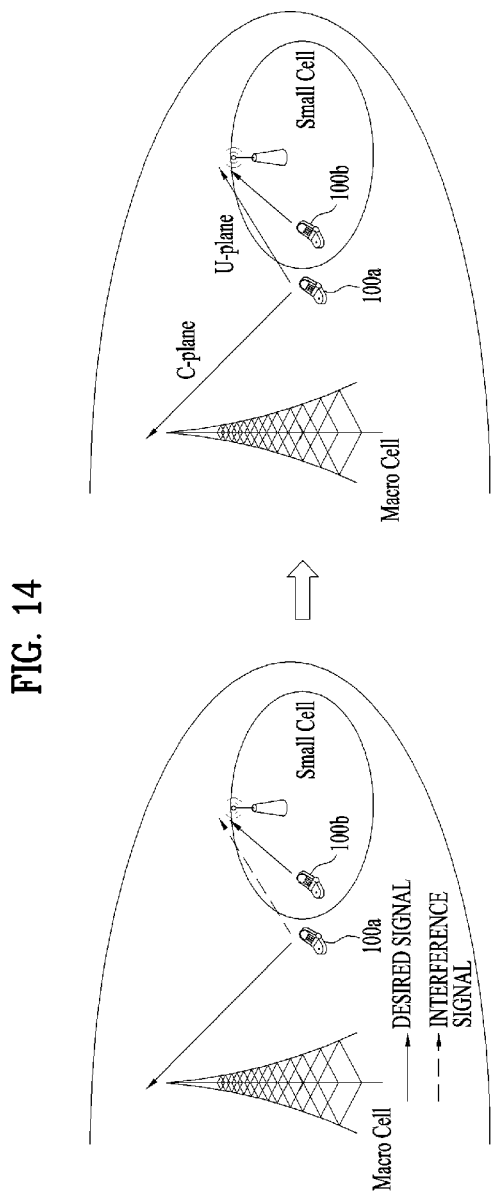
FIG. 14 is a diagram illustrating a procedure of configuring dual connectivity to a UE according to another embodiment of the present invention.
Figure 15:
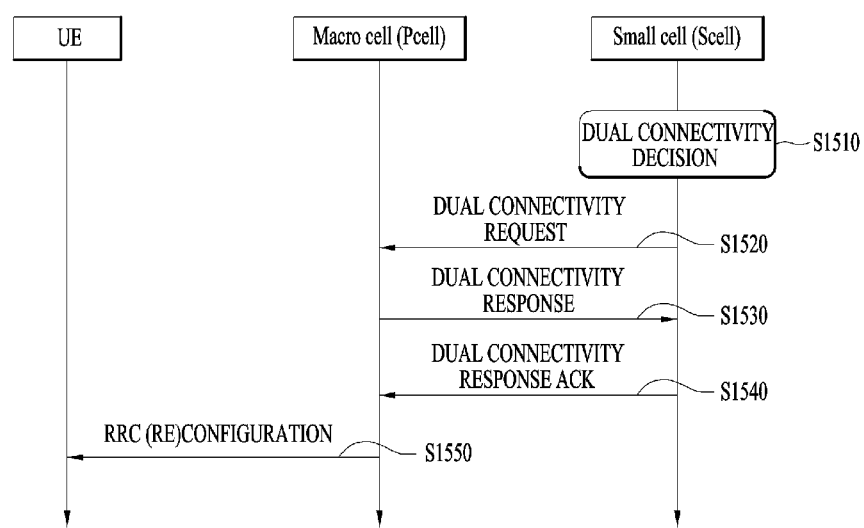
FIG. 15 is a flowchart of a procedure of configuring dual connectivity to a UE according to another embodiment of the present invention.

FIGS. 10 to 15 illustrate embodiments in which dual connectivity is configured to a macro UE. FIGS. 10 and 13 illustrate an embodiment for DL interference reduction of a UE, and FIGS. 14 and 15 illustrate an embodiment for UL interference reduction of the UE.

Figure 18:
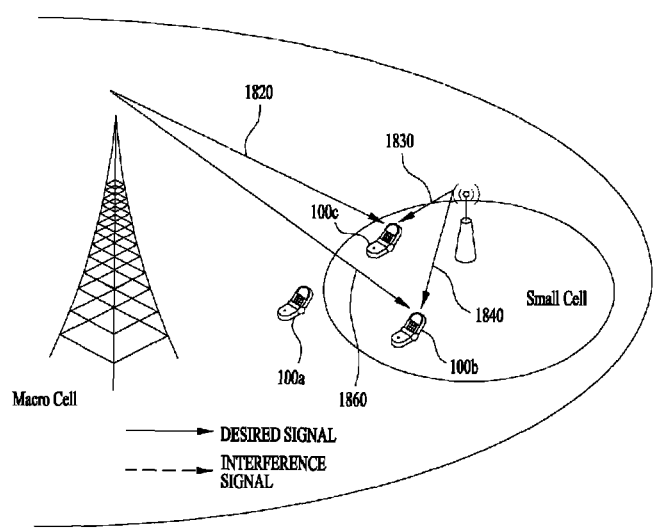
FIG. 18 is a flowchart of a procedure of configuring dual connectivity to a UE according to another embodiment of the present invention.
Figure 19:
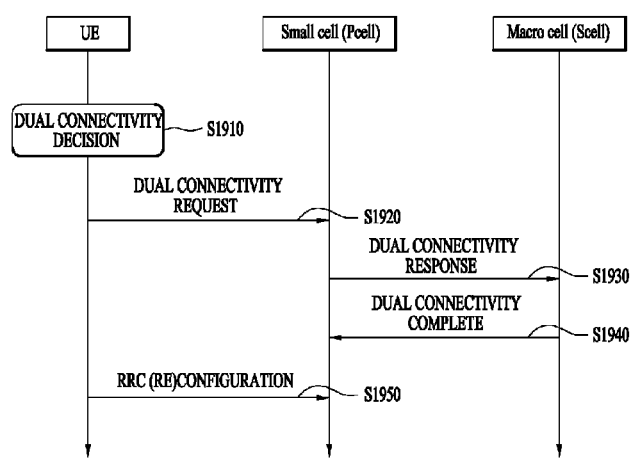
FIG. 19 is a flowchart of a procedure of configuring dual connectivity to a UE according to another embodiment of the present invention.
Figure 20:
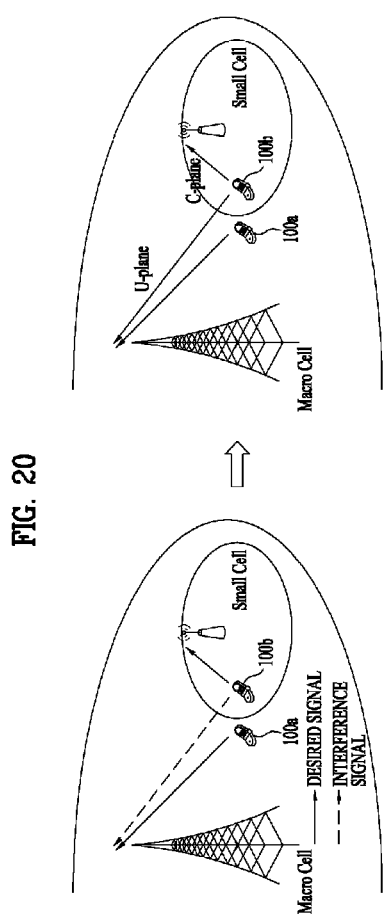
FIG. 20 is a diagram illustrating a procedure of configuring dual connectivity to a UE according to another embodiment of the present invention.
Figure 21:
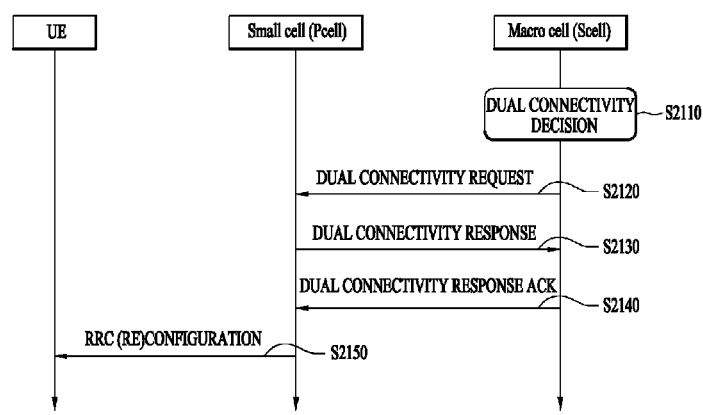
FIG. 21 is a flowchart of a procedure of configuring dual connectivity to a UE according to another embodiment of the present invention.

FIGS. 16 to 21 illustrate embodiments in which dual connectivity is configured to a small UE. FIGS. 16 to 19 illustrate an embodiment for DL interference reduction of a UE, and FIGS. 20 and 21 illustrate an embodiment for UL interference reduction of the UE.

FIG. 10 is a diagram illustrating a process in which dual connectivity is configured to a UE according to an embodiment of the present invention.

As described with reference to FIG. 8, when a macro cell and a small cell use the same resource, the macro UE 100*a* adjacent to the small cell and connected to the macro cell (C-plane and U-plane) may be interfered by the small cell. That is, the macro UE 100*a* may be affected by interference due to a DL signals to the small UE 100*b* that is connected to a small cell or simultaneously connected to the small cell and the macro cell (in this case, the macro UE may be called a victim UE and the small UE may called an aggressor UE.

In order to reduce or remove interference to the macro UE 100*a*, the macro UE 100*a* may be connected to both the small cell and the macro cell. Thus, in the small cell, a resource that has been allocated to the existing small UE 100*b* may not be allocated to a newly connected to the macro UE 100*a*, and thus, interference between the two UEs 100*a* and 100*b* may be removed.

The macro UE 100*a* that is interfered by a small cell as illustrated in a left portion of FIG. 10 may be switched to a dual connectivity state by additionally connecting to the small cell as illustrated in a right portion of FIG. 10. That is, dual connectivity may be configured to the macro UE 100*a*. In this case, the macro UE 100*a* configured with dual connectivity may configure a C-plane with the already connected macro cell and a U-plane with the newly connected small cell. Alternatively, the C-plane may be switched to configure the U-plane with the already connected macro cell and the C-plane with the newly connected small cell for the respective UEs.

Thus far, an embodiment of configuring dual connectivity for the macro UE 100*a* connected to the macro cell only has been described, but the present invention is not limited thereto. That is, the present invention may also be applied to a UE that has been already configured with dual connectivity and is connected to the macro cell and the small cell. In detail, the macro UE configured with the C-plane from the macro cell and configured with the U-plane from the macro cell and the small cell can transmit and receive data to and from the U-plane of the macro cell. When a resource corresponding to the U-plane of the macro cell is the same as a resource allocated to the small cell, the aforementioned method can also be applied to the macro UE.

There may be various conditions for connecting the macro UE 100*a* that receives a service from the macro cell to both the small cell and the macro cell. For example, the conditions may correspond to the case in which the signal intensity (reference signal received power (RSRP) or reference signal received quality (RSRQ)) of the small cell measured by the macro UE 100*a* is equal to or greater than a predetermined threshold, the case in which a signal to interference plus noise ratio (SINR) from the small cell measured by the macro UE 100*a* is equal to or greater than a predetermined threshold, the case in which the macro cell determines to offload the macro UE 100*a* to the small cell, or the like.

When the macro UE 100*a* satisfies one of the aforementioned conditions or two or more combined conditions, the macro UE 100*a* may become a dual connectivity UE connected to both the small cell and the macro cell. The aforementioned thresholds may be identical or different and may be transmitted to the macro UE 100*a* via an RRC configuration image by a network (a serving cell (PCell/SCell)). In addition, these thresholds may be determined cell-specifically or UE-specifically.

FIG. 11 is a diagram illustrating a procedure of configuring dual connectivity to a UE according to another embodiment of the present invention. FIG. 11 illustrates an embodiment in which a macro cell configures dual connectivity to a macro UE. In FIG. 11, a UE is a macro UE using a macro cell as a serving cell.

When the measured value from the small cell satisfies a predetermined condition, the UE transmits a measurement report message to the macro cell as a serving cell (S1105). The measurement report message may indicate that the measured value from the small cell satisfies one or more of the various conditions described with reference to FIG. 10.

The macro cell that receives the measurement report message determines whether dual connectivity is to be supported for the UE (S1110). That is, since influence of an interference signal from the small cell on DL of the UE is high, the macro cell may configure dual connectivity with the small cell to the UE to determine to reduce interference influence to the UE. In addition, the macro cell may configure dual connectivity of the UE in order to perform offloading to the small cell in consideration of a current load situation.

When the macro cell determines to configure dual connectivity to the UE, the macro cell transmits a dual connectivity request message to the small cell (S1115). The dual connectivity request message may include at least one of "a message type, UE context information (e.g., UE X2AP ID or cell-radio network temporary identifier (C-RNTI) of a UE in the macro cell, an E-UTRAN radio access bearer (E-RAB) ID, QoS class identifier (QCI), allocation and retention priority (ARP), user equipment-aggregated maximum bit rate (UE-AMBR), S1 serving gateway tunnel endpoint identifier (S1 S-GW TEID), etc.), a dedicated preamble that the UE is supposed to use for the small cell, information about black resources that the small cell should avoid in scheduling the UE, information about white resources that the small cell can allocate in scheduling the UE, an E-UTRAN cell global identifier (ECGI) or PCID of the macro cell, an ECGI or PCID of the small cell, and/or an indicator indicating U-plane switching". The dual connectivity request message may be transmitted via the backhaul between the macro cell and the small cell (e.g., an X2 interface or an air interface).

A data radio bearer (DRB) ID may be allocated for use in a radio link between the UE and the small cell and the C-RNTI of the UE in the small cell may also be transmitted. The macro cell may also transmit the E-RAB ID to be used in the small cell. When dual connectivity is configured, U-plane of the macro cell may be switched to the small cell or a new U-plane with the small cell may be generated instead of switching.

The small cell that receives the dual connectivity request message determines to support dual connectivity of the UE in consideration of a load situation of the small cell, QCI of the UE, etc. Then the small cell establishes an S1 UL bearer between the small cell and S-GW using S1 S-GW TEID included in the dual connectivity request message. As described above, the small cell may use a DRIB ID allocated by the macro cell or may directly allocate and use the DRB ID.

The small cell transmits a dual connectivity response message to the macro cell (S1120). The dual connectivity response message may include at least one of "a message type, an ECGI or PCID of the macro cell, an ECGI or PCID of the small cell, a C-RNTI of the UE in the small cell (when the small cell directly allocates the C-RNTI of the UE), ACK to an indicator for switching U-plane of the macro cell, information about black resources that the macro cell should avoid in allocation to the UE, information about white resources that the macro cell can allocate in scheduling the UE, a DRB ID, and/or a UE X2AP ID or C-RNTI of the UE in the macro cell" and may be transmitted via backhaul between the macro cell and the small cell.

The information about the white/black resources that are transmitted and received between the macro ell and the small cell may be configured in units of a physical resource block (PRB). If a resource block group (RBG) unit is determined according to a bandwidth, when an X2 interface between the macro/small cells is formed, configuration information about the RBG unit may be exchanged to transmit the information about the white/black resources may be transmitted in units of an RBG.

The macro cell that receives the dual connectivity response message can know that the small cell can be connected to the UE. The macro cell transmits an RRC (re)configuration message for configuring dual connectivity to the UE (S1125). The RRC (re)configuration message may include at least one of "a message type, an ECGI or PCID of the small cell, SCellindex of the small cell, DL/UL frequency of the small cell, and/or an indicator indicating configuration of the small cell". In addition, the aforementioned RRC (re)configuration message may also include a C-RNTI value to be used in the small cell by the UE and information about a DRB ID to be used in a radio link between the UE and the small cell.

Then the small cell connected to the UE is activated based on an activation/deactivation message transmitted in the macro cell or a specific small cell. When data to be transmitted to the small cell by the UE that receives the activation message is present, the UE performs a procedure for acquiring UL synchronization to the small cell. That is, the UE transmits the synchronization signal (or message) to the small cell (S1130). The synchronization signal may include a dedicated preamble included in the dual connectivity request message that has been transmitted to the small cell from the macro cell.

The small cell that receives the synchronization signal from the UE transmits information about timing advance (TA) along with UL allocation (S1135). The UE that receives the information transmits an RRC connection configuration complete message to the macro cell (S1140).

Accordingly, the macro cell can know that the UE completes synchronization with the small cell. The macro cell transmits a dual connectivity complete message indicating that the UE completes the synchronization with the small cell to the small cell (S1145). The dual connectivity complete message may include at least one of "a message type, a UE X2AP ID or C-RNTI of the UE in the macro cell (or the small cell), an ECGI or PCID of the small cell, an ECGI or PCID of the macro cell, and/or an S1 TEID allocated to the small cell by the macro cell". The small cell that receives the dual connectivity complete message establishes DRB with the UF.

Then the macro cell transmits a path switch request message to a mobility management entity (MME) to indicate switching of the U-plane servicing the UE and request path switching to the MME (S1150). The path switch request message may include at least one of "a message type, an S1 DL TEID allocated to the small cell by the macro cell, an E-RAB ID, and/or the ECGI of the small cell".

The MME that receives the path switch request message transmits a modify bearer request message to the S-GW (S1155). The modify bearer request message may include information included in the path switching request message received by the MME. The S-GW that receives the modify bearer request message may establish a DL S1 bearer with the small cell. When the DL S1 bearer setup is completed, the S-GW transmits a modify bearer response message to the MME (S1160).

The MME that receives the modify bearer response message transmits a path switch request Ack message to the macro cell (S1165) and the macro cell can know that the S-GW switches a path of an evolved packet system (EPS) bearer.

FIG. 12 is a flowchart of a procedure of configuring dual connectivity to a UE according to another embodiment of the present invention. In addition to the description given with reference to FIG. 11, detailed matters considered during configuration of dual connectivity to the UE will be described with reference to FIG. 12.

In FIG. 12, a first UE 100a is a macro UE that is a dual-connectivity UE with the macro cell and the small cell. A second UE 100b is a small UE that is located in the small cell and connected to the small cell. A third UE 100c is a macro UE that is connected to the macro cell. When influence of interference to the third UE 100c from the small cell increases and dual connectivity to the macro cell and the small cell is configured to the third UE 100c, the small cell needs to consider the following matters while the small cell allocates a resource to the third UE 100c.

First, a resource 1220 allocated to the third UE 100c by the small cell needs to be different from a resource 1210 allocated to the third UE 100c by the macro cell. That is, since dual connectivity is configured to the third. UE 100c in order to remove interference to the third UE 100c, the small cell allocates a different resource from the resource 1210 allocated by the macro cell to the third UE 100c.

Accordingly, the macro cell pre-transmits information about resources (black resources) that the small cell should avoid during resource allocation to the third UP 100c as a dual connectivity UE, to the small cell. That is, the small cell may allocate resources except for the black resources to the third UE 100c using the information about the black resources, included in the aforementioned dual connectivity request message.

In addition, the macro cell may contain the information about white resources that the small cell can allocate to the third UE 100c in the dual connectivity request message and transmit the resultant information. Thus, the small cell may determine and allocate resources to be allocated to the third UE 100c from the information about the white resources.

An opposite case can be considered. That is, unlike in the aforementioned embodiment, the macro cell can consider the information about the black/white resources in order to prevent new interference due to dual connectivity. That is, when the resource 1220 allocated to the third UE 100c by the small cell is configured to be the same as a resource 1250 allocated to the first UE 100a by the macro cell, new interference occurs due to dual connectivity.

Thus, the small cell may contain the information about the black/white resources to be considered during switching of the resource 1250 allocated to the first UE 100a by the macro cell in the dual connectivity response message and transmit the resultant information to the macro cell. The macro cell may allocate resources of the first UE 100a and/or the third UE 100c in consideration of information received from the small cell.

FIG. 13 is a flowchart of a procedure of configuring dual connectivity to a UE according to another embodiment of the present invention. FIG. 13 illustrates an embodiment in the macro UE itself configures dual connectivity.

When a predetermined condition for configuring dual connectivity is satisfied, the macro UE determines to configure dual connectivity (S1310). The condition may be predetermined according to the description that has been given with reference to FIGS. 10 and 11.

Then the macro UE transmits a dual connectivity request message to the macro cell (S1320). The dual connectivity request message may be transmitted via an RRC signal or a MAC signal and may include at least one of "a message type and/or an ECGI or PCID of the small cell".

Then the macro cell requests the small cell for configuration of dual connectivity (S1330). When the macro cell receives a dual connectivity response message from the small cell (S1340), the macro cell transmits an RRC (re) configuration message to the UE and configures dual connectivity to the macro cell and the small cell (S1350). The aforementioned operations S1330 to S1350 may be embodied similarly to operations S1115 to S1125 of FIG. 11.

FIG. 14 is a diagram illustrating a procedure of configuring dual connectivity to a UE according to another embodiment of the present invention. FIGS. 14 and 15 illustrate an embodiment associated with UL unlike in FIGS. 10 to 13.

As illustrated in FIG. 14, when the macro cell and the small cell use the same resource, a UL signal of the macro UE 100*a* positioned adjacent to the small cell may act as an interference signal to the UL signal of the small UE 100*b* positioned in the small cell. Thus, dual connectivity to the macro cell and the small cell may be configured to the macro UE 100*a* in order to remove or reduce interference to the UL signal of the small UE 100*b*. Thus, the small cell may not allocate UL resources of the small UE 100*b* to remove UL interference.

In FIG. 14, dual connectivity is configured to the macro UE 100*a* for UL of the small UE 100*b* that is interfered by the macro UE 100*a*. In this case, the macro UE 100*a* may receive C-plane from the already connected macro cell and receive U-plane from the small cell. Alternatively, the macro UE 100*a* may switch C-plane to receive U-plane from the existing macro cell and to receive C-plane from the small cell.

Dual connectivity may be configured to the macro UE 100*a* according to various conditions. For example, when UL signal intensity from the small. UE 100*b* measured by the small cell (RSRP or RSRQ) is equal to or smaller than a predetermined threshold, or the macro cell determines to offload the macro UE 100*a* to the small cell, dual connectivity may be configured to the macro UE 100*a*. When at least one of the aforementioned conditions is satisfied, dual connectivity may be configured to the macro UE 100*a*, and the threshold may be set by a network and may be set cell-specifically or UE-specifically.

In some embodiments, there may be various methods of configuring dual connectivity to the macro UE 100*a*. Hereinafter, a case in which the macro cell configures dual connectivity to the macro UE 100*a* will be described.

The macro cell may configure dual connectivity to the macro UE 100*a* adjacent to the small cell in order to offload the macro UE 100*a* to the small cell in consideration of load situation. The procedure according to the present embodiment is similar or the same as an embodiment in which dual connectivity is configured to the macro UE 100*a* due to the aforementioned DL interference, and the operations S1150 to S1165 of FIG. 11 may be omitted. The procedure according to the present embodiment is different from the embodiment in that the information about the black/white resources transmitted to the small cell by the macro cell is information about UL resources, but not DL resources.

FIG. 15 is a flowchart of a procedure of configuring dual connectivity to a UE according to another embodiment of the present invention. FIG. 15 illustrates the case in which the small cell configures dual connectivity to the macro UE unlike in FIG. 14.

When the small cell measures a UL signal received from the small UE, if the aforementioned conditions are satisfied, the small cell determines to configure dual connectivity to the macro UE (S1510). Then the small cell transmits the dual connectivity request message to the macro cell (S1520). The dual connectivity request message may include at least one of "a message type, information about black resources that the macro cell should avoid in scheduling the UE, information about white resources that the macro cell can allocate in scheduling the UE, an E-UTRAN cell global identifier (ECGI) or PCID of the macro cell and/or an ECGI or PCID of the small cell" and may be transmitted via backhaul between the macro cell and the small cell. The black recourse information may include information allocated to the small UE, that is, information about influence of interference from the macro UE in the small cell.

The macro cell that receives the dual connectivity request message is adjacent to the small cell and determines to configure dual connectivity to the macro UE. Then the macro cell transmits the dual connectivity response message to the small cell (S1530). The dual connectivity response message may include at least one of "a message type, UE context information (e.g., UE X2AP ID or C-RNTI of a UE in the macro cell, E-RAB ID, QCI, ARP, UE-AMBR, S1 S-GW TEID, etc.), information about black resources that the small cell should avoid during allocation to the UE, information about white resources that the small cell can allocate in scheduling the UE, an ECGI or PCID of the macro cell, an ECGI or PCID of the small cell, and/or an indicator indicating switching of a U-plane in the macro cell" and may be transmitted via backhaul.

In addition, the macro cell may allocate a DRB ID to be used in a radio link between the UE and the small cell, and a C-RNTI value of the UE in the small cell may be transmitted in the small cell. Furthermore, the macro cell may transmit an E-RAB ID to be used in the small cell. When dual connectivity is configured, a U-plane of the macro cell may be switched to the small cell, and a new U-plane with the small cell may be generated instead of switching.

When the small cell can configure dual connectivity to the UE (in consideration of load situation of the small cell, QCI of the UE, etc.), the small cell establishes an S1 UL bearer between the small cell and the S-GW using the S1 S-GW TEID contained in the dual connectivity response message. As described above, the small cell may use the DRB ID allocated by the macro cell or may directly allocate and use the DRB ID.

Then the small cell transmits a dual connectivity response Ack message to the macro cell (S1540). The dual connectivity response Ack message may include at least one of "a message type, an ECGI or PCID of the macro cell, an ECGI or PCID of the small cell, a C-RNTI of the UE in the small cell (when the small cell directly allocates the C-RNTI of the UE), and/or ACK to an indicator for switching of a U-plane of the macro cell" and may be transmitted via backhaul with the macro cell.

Upon receiving the dual connectivity response Ack message, the macro cell can know that the small cell is connected to the macro UE. Then the macro cell transmits an RRC (re)configuration message for configuring dual connectivity to the macro UE (S1550). The RRC (re)configuration message may include at least one of "a message type, an ECGI or POD of the small cell, SCellindex of the small cell, DL/UL frequency of the small cell, and/or an indicator indicating configuring of the small cell". The aforementioned RRC (re)configuration message may include a C-RNTI value to be used by the UE in the small cell and information about the DRB ID to be used in a radio link between the macro UE and the small cell.

Subsequent to operation S1550, the macro UE performs a procedure of acquisition of UL synchronization with the small cell. This procedure may be the same or similar to the aforementioned operations S1130 to S1145 of FIG. 11. A path switching procedure is not necessary for UL, and thus, operations S1150 to S1165 may be omitted.

Figure 16:
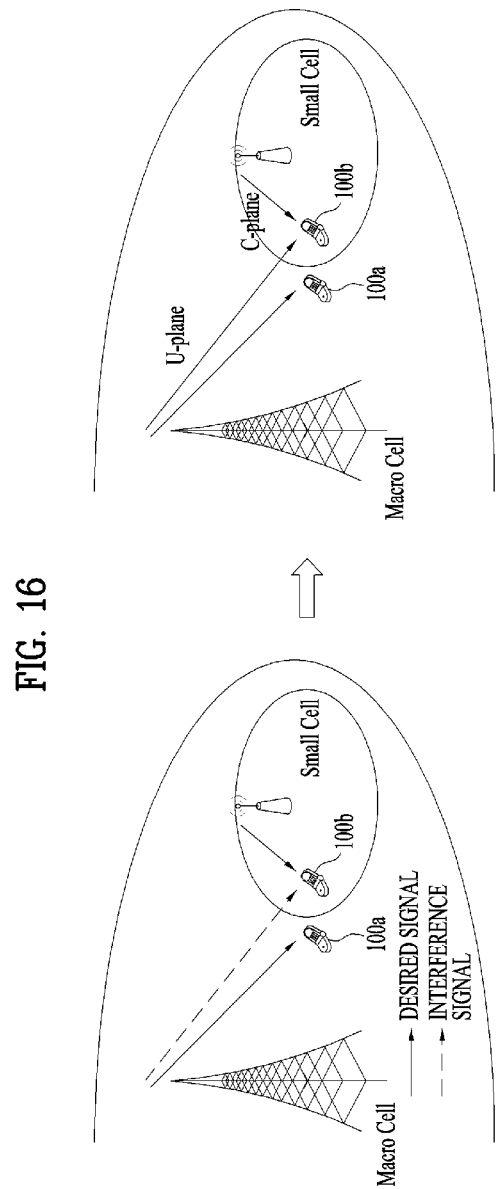
FIG. 16 is a diagram illustrating a procedure of configuring dual connectivity to a UE according to another embodiment of the present invention.

FIG. 16 is a diagram illustrating a procedure of configuring dual connectivity to a UE according to another embodiment of the present invention. As described above, FIGS. 16 to 19 illustrate an embodiment for reduction of DL interference of the UE and FIGS. 20 and 21 illustrate an embodiment for reduction of UL interference of the UE.

The small UE 100b that is allocated the same resource as a resource allocated to the macro UE 100a is DL interfered by the macro cell. In order to remove or reduce interference to the small UE 100b, dual connectivity to the macro cell and the small cell may be configured to the small UE 100b. Thus, the resource allocated to the macro UE 100a by the macro cell is not allocated to the small UE 100b. In this case, the small UE may be referred to as a victim UE and the macro UE may be referred to as an aggressor UE.

The small UE 100b that is interfered by the macro cell as illustrated in a left portion of FIG. 16 may be switched to a dual connectivity state in which the small UE 100b is connected to both the small cell and the macro cell as illustrated in a right portion of FIG. 16. That is, dual connectivity may be configured to the small UE 100b. In this case, the Mcell 100b configured with dual connectivity may configure a C-plane with the already connected small cell and a U-plane with the newly connected macro cell. Alternatively, the C-plane may be switched to configure the U-plane with the already connected small cell and the C-plane with the newly connected macro cell for the respective UEs.

There may be various conditions for connecting the small UE 100b that receives a service from the small cell to both the small cell and the macro cell. For example, the conditions may correspond to the case in which the signal intensity (RSRP or RSRQ) of the macro cell measured by the small UE 100b is equal to or greater than a predetermined threshold, the case in which an SINR from the macro cell measured by the small UE 100b is equal to or greater than a predetermined threshold, the case in which the small cell determines to offload the small UE 100b to the macro cell, or the like.

When the small UE 100b satisfies one of the aforementioned conditions or two or more combined conditions, the small UE 100b may become a dual connectivity UE connected to both the small cell and the macro cell. The aforementioned thresholds may be identical or different and may be transmitted to the small UE 100b via an RRC configuration image by a network (a serving cell (PCell/SCell)). In addition, these thresholds may be determined cell-specifically or UE-specifically.

Figure 17:
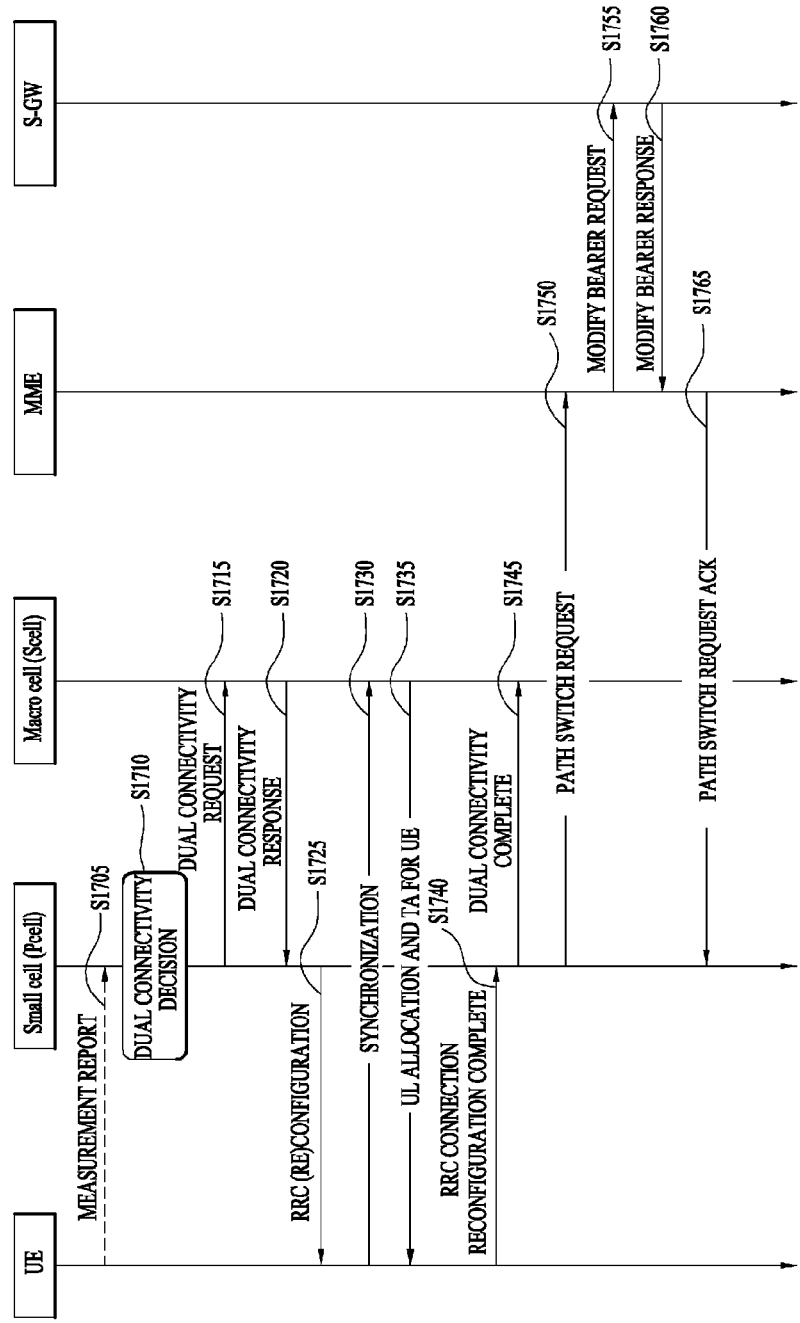
FIG. 17 is a diagram illustrating a procedure of configuring dual connectivity to a UE according to another embodiment of the present invention.

FIG. 17 is a diagram illustrating a procedure of configuring dual connectivity to a UE according to another embodiment of the present invention. FIG. 17 illustrates an embodiment in which a small cell configures dual connectivity to a small UE. In FIG. 17, a UE is a small UE using a small cell as a serving cell.

When the measured value from the macro cell satisfies a predetermined condition, the UE transmits a measurement report message to the small cell as a serving cell (S1705). The measurement report message may indicate that the measured value from the macro cell satisfies one or more of the various conditions described with reference to FIG. 16.

The small cell that receives the measurement report message determines whether dual connectivity is to be supported for the UE (S1710). That is, since influence of an interference signal from the macro cell on DL of the UE is high, the small cell may configure dual connectivity with the small cell to the UE to determine to reduce interference influence to the UE. In addition, the small cell may configure dual connectivity of the UE in order to perform offloading to the macro cell in consideration of a current load situation.

When the small cell determines to configure dual connectivity to the UE, the small cell transmits a dual connectivity request message to the macro cell (S1715). The dual connectivity request message may include at least one of "a message type, UE context information (e.g., UE X2AP ID or C-RNTI of a UE in the small cell, an E-RAB ID, QCI, ARP, UE-AMBR, S1 S-GW TEID, etc.), a dedicated preamble that the UE is supposed to use for the macro cell, information about black resources that the macro cell should avoid in scheduling the UE, information about white resources that the macro cell can allocate in scheduling the UE, an ECGI or PCID of the small cell, an ECGI or PCID of the macro cell, and/or an indicator indicating U-plane switching". The dual connectivity request message may be transmitted via the backhaul between the macro cell and the small cell (e.g., an X2 interface or an air interface).

A DRB ID may be allocated for use in a radio link between the UE and the macro cell and the C-RNTI of the UE in the macro cell may also be transmitted. The small cell may also transmit the E-RAB ID to the used in the macro cell. When dual connectivity is configured, a U-plane of the small cell may be switched to the macro cell or a new U-plane with the macro cell may be generated instead of switching.

The macro cell that receives the dual connectivity request message determines to support dual connectivity of the UE in consideration of a load situation of the small cell, QCI of the UE, etc. Then the macro cell establishes an S1 UL bearer between the macro cell and S-GW using S1 S-GW TEID included in the dual connectivity request message. As described above, the macro cell may use a DRB ID allocated by the small cell or may directly allocate and use the DRB ID.

The macro cell transmits a dual connectivity response message to the small cell (S1720). The dual connectivity response message may include at least one of "a message type, an ECGI or PCID of the small cell, an ECGI or PCID of the macro cell, a C-RNTI of the UE in the macro cell (or a C-RNTI of the UE in the small cell), ACK to an indicator for switching a U-plane of the small cell, information about black resources that the small cell should avoid in allocation to the UE, information about white resources that the small cell can allocate in scheduling the UE, a DRB ID, and/or a UE X2AP ID or C-RNTI of the UE in the small cell" and may be transmitted via backhaul between the macro cell and the small cell.

The information about the white/black resources that are transmitted and received between the macro ell and the small cell may be configured in units of a PRB. If a RBG unit is determined according to a bandwidth, when an X2 interface between the macro/small cells is formed, configuration information about the RBG unit may be exchanged to transmit the information about the white/black resources may be transmitted in units of an RBG.

The small cell that receives the dual connectivity response message can know that the macro cell can be connected to the UE. The small cell transmits an RRC (re)configuration message for configuring dual connectivity to the UE (S1725). The RRC (re)configuration message may include at least one of "a message type, an ECGI or PCID of the macro cell, SCellindex of the macro cell, DL/UL frequency of the macro cell, and/or an indicator indicating configuration of the macro cell". In addition, the aforementioned RRC (re)configuration message may also include a C-RNTI value to be used in the macro cell by the UE and information about a DRB ID to be used in a radio link between the UE and the macro cell.

Then the macro cell connected to the UE is activated based on an activation/deactivation message transmitted in the small cell or a specific macro cell. When data to be transmitted to the macro cell by the UE that receives the activation message is present, the UE performs a procedure for acquiring UL synchronization to the macro cell. That is, the UE transmits the synchronization signal (or message) to the macro cell (S1730). The synchronization signal may include a dedicated preamble included in the dual connectivity request message that has been transmitted to the macro cell from the small cell.

The macro cell that receives the synchronization signal from the UE transmits information about TA along with UL allocation (S1735). The UE that receives the information transmits an RRC connection configuration complete message to the small cell (S1740).

Accordingly, the small cell can know that the UE completes synchronization with the macro cell. The small cell transmits a dual connectivity complete message indicating that the UE completes the synchronization with the macro cell to the macro cell (S1745). The dual connectivity complete message ay include at least one of "a message type, a UE X2AP ID or C-RNTI of the UE in the small cell (or the macro cell), an ECGI or PCID of the macro cell, an ECGI or PCID of the macro cell, and/or an S1 TEID allocated to the macro cell by the small cell". The macro cell that receives the dual connectivity complete message establishes DRB with the UE.

Then the small cell transmits a path switch request message to an MME to indicate switching of the U-plane servicing the UE and request path switching to the MME (S1750). The path switching request message may include at least one of "a message type, an S1 DL TEID allocated to the macro cell by the small cell, an E-RAB ID, and/or the ECGI of the macro cell".

The MME that receives the path switching request message transmits a modify bearer request message to the S-GW (S1755). The modify bearer request message may include information included in the path switching request message received by the MME. The S-GW that receives the modify bearer request message may establish a DL S1 bearer with the macro cell. When the DL S1 bearer setup is completed, the S-GW transmits a modify bearer response message to the MME (S1760).

The MME that receives the modify bearer response message transmits a path switch request Ack message to the small cell (S1765) and the small cell can know that the S-GW switches a path of an EPS bearer.

FIG. 18 is a flowchart of a procedure of configuring dual connectivity to a UE according to another embodiment of the present invention. In addition to the description given with reference to FIG. 17, detailed matters considered during configuration of dual connectivity to the UE will be described with reference to FIG. 18.

In FIG. 18, the first UE 100a is a macro UE that is connected to the macro cell. The second UE 100b is a small UE that is located in the small cell and is a dual-connectivity UE with the small cell and the macro cell. The third UE 100c is a small UE that is connected to the small cell. When influence of interference to the third UE 100c from the macro cell increases and dual connectivity to the macro cell and the small cell is configured to the third UE 100c, the macro cell needs to consider the following matters while the macro cell allocates a resource to the third UE 100c.

First, a resource 1820 allocated to the third UE 100c by the macro cell needs to be different from a resource 1830 allocated to the third. UE 100c by the small cell. That is, since dual connectivity is configured to the third UE 100c in order to remove interference to the third UE 100c, the macro cell allocates a different resource from the resource 1830 allocated by the small cell to the third UE 100c.

Accordingly, the small cell pre-transmits information about resources (black resources) that the macro cell should avoid during resource allocation to the third UE 100c as a dual connectivity UE, to the macro cell. That is, the macro cell may allocate resources except for the black resources to the third UE 100c using the information about the black resources, included in the aforementioned dual connectivity request message.

In addition, the small cell may contain the information about white resources that the macro cell can allocate to the third UE 100c in the dual connectivity request message and transmit the resultant information. Thus, the macro cell may determine and allocate resources to be allocated to the third UE 100c from the information about the white resources.

An opposite case can be considered. That is, unlike in the aforementioned embodiment, the small cell can consider the information about the black/white resources in order to prevent new interference due to dual connectivity. That is, when the resource 1820 allocated to the third UE 100c by the macro cell is configured to be the same as a resource 1840 allocated to the second UE 100b by the small cell, new interference occurs due to dual connectivity.

Thus, the macro cell may contain the information about the black/white resources to be considered during switching of the resource 1840 allocated to the second UE 100b by the small cell in the dual connectivity response message and transmit the resultant information to the small cell. The small cell may allocate resources of the second UE 100b and/or the third UE 100c in consideration of information received from the macro cell.

FIG. 19 is a flowchart of a procedure of configuring dual connectivity to a UE according to another embodiment of the present invention. FIG. 19 illustrates an embodiment in the small UE itself configures dual connectivity.

When a predetermined condition for configuring dual connectivity is satisfied, the small UE determines to configure dual connectivity (S1910). The condition may be predetermined according to the description that has been given with reference to FIGS. 16 and 17.

Then the small UE transmits a dual connectivity request message to the small cell (S1920). The dual connectivity request message may be transmitted via an RRC signal or a MAC signal and may include at least one of "a message type and/or an ECGI or PCID of the macro cell".

Then the small cell requests the macro cell for configuration of dual connectivity (S1930). When the small cells receives a dual connectivity response message from the macro cell (S1940), the small cell transmits an RRC (re) configuration message to the UE and configures dual connectivity to the macro cell and the small cell (S1950). The aforementioned operations S1930 to S1950 may be embodied similarly to operations S1715 to S1725 of FIG. 17.

FIG. 20 is a diagram illustrating a procedure of configuring dual connectivity to a UE according to another embodiment of the present invention. FIGS. 20 and 21 illustrate an embodiment associated with UL unlike in FIGS. 16 to 19.

As illustrated in FIG. 20, when the macro cell and the small cell use the same resource, a UL signal of the small UE 100*b* positioned adjacent to the macro cell may act as an interference signal to the UL signal of the macro UE 100*a* positioned in the macro cell. Thus, dual connectivity to the macro cell and the small cell may be configured to the small UE 100*b* in order to remove or reduce interference to the UL signal of the macro UE 100*a*. Thus, the macro cell may not allocate UL resources of the macro UE 100*a* to remove UL interference.

In FIG. 20, dual connectivity is configured to the small UE 100*b* for UL of the macro UE 100*a* that is interfered by the small UE 100*b*. In this case, the small UE 100*b* may receive a C-plane from the already connected small cell and receive a U-plane from the macro cell. Alternatively, the small UE 100*b* may switch a C-plane to receive a U-plane from the existing small cell and to receive a C-plane from the macro cell.

Dual connectivity may be configured to the small UE 100*b* according to various conditions. For example, when UL signal intensity from the macro UE 100*a* measured by the macro cell (RSRP or RSRQ) is equal to or smaller than a predetermined threshold, or the small cell determines to offload the small UE 100*b* to the small cell, dual connectivity may be configured to the small UE 100*b*. When at least one of the aforementioned conditions is satisfied, dual connectivity may be configured to the small UE 100*b*, and the threshold may be set by a network and may be set cell-specifically or UE-specifically.

In some embodiments, there may be various methods of configuring dual connectivity to the small UE 100*b*. Hereinafter, a case in which the small cell configures dual connectivity to the small UE 100*b* will be described.

The small cell may configure dual connectivity to the small UE 100*b* adjacent to the macro cell in order to offload the small UE 100*b* to the macro cell in consideration of load situation. The procedure according to the present embodiment is similar or the same as an embodiment in which dual connectivity is configured to the small UE 100*b* due to the aforementioned DL interference, and the operations S1750 to S1765 of FIG. 17 may be omitted. The procedure according to the present embodiment is different from the embodiment in that the information about the black/white resources transmitted to the macro cell by the small cell is information about UE resources, but not DE resources.

FIG. 21 is a flowchart of a procedure of configuring dual connectivity to a UE according to another embodiment of the present invention. FIG. 21 illustrates the case in which the macro cell configures dual connectivity to the small UE unlike in FIG. 20.

When the macro cell measures a UL signal received from the macro UE, if the aforementioned conditions are satisfied, the macro cell determines to configure dual connectivity to the small UE (S2110). Then the macro cell transmits and receives to and from the small cell in order to determine dual connectivity to the small UE. The procedure described with reference to FIG. 15 can be similarly applied to this series of operations. However, the procedure of FIG. 15 is different from the procedure of FIG. 21 in that teh small cell is configured to the PCell and the macro cell is configured to the SCell with respect to the small UE.

Thus far, the procedure of configuring dual connectivity to the UE to switch a U-plane has been mainly described. However, the aforementioned procedures can be similarly applied to a procedure of switching a C-plane. In addition, a procedure of configuring dual connectivity to the UE in consideration of both the aforementioned DL embodiment and UL embodiment can be performed.

4. Apparatus Structure

Figure 22:
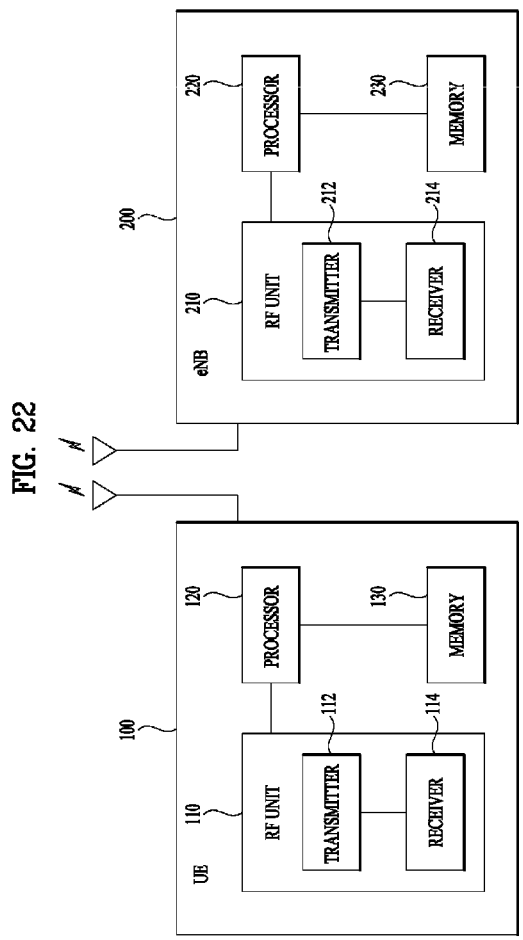
FIG. 22 is a block diagram of a structure of a UE and an eNB according to an embodiment of the present invention.

FIG. 22 is a block diagram of a structure of a UE 100 and an eNB 200 according to an embodiment of the present invention.

In FIG. 22, the UE 100 and the eNB 200 may include radio frequency (RF) units 110 and 210, processors 120 and 220, and memories 130 and 230, respectively. Although FIG. 22 illustrates a 1:1 communication environment between the UE 100 and the eNB 200, a communication environment between a plurality of UEs and the eNB 200 can also be established. In addition, the eNB 200 of FIG. 22 can be applied to both a macro cell eNB and a small cell eNB.

The RF units 110 and 210 may include transmitters 112 and 212 and receivers 114 and 214, respectively. The transmitter and 112 and the receiver 114 of the UE 100 may be configured to transmit and receive signals to and from the eNB 200 and other UEs and the processor 120 may be functionally connected to the transmitter 112 and the receiver 114 to control a process of transmitting and receiving signals to and from other devices by the transmitter 112 and the receiver 114. The processor 120 performs various processing processes on signals to be transmitted and then transmits the processed signals to the transmitter 112 and performs processing on the signals received by the receiver 114.

As necessary, the processor 120 may store information contained in exchanged message in the memory 130. Based on this structure, the UE 100 can perform various methods according to the aforementioned embodiments of the present invention.

The transmitter 212 and the receiver 214 of the eNB 200 may be configured to transmit and receive signals to and from other eNBs and UEs and the processor 220 may be functionally connected to the transmitter 212 and the receiver 214 to control a process of transmitting and receiving signals to and from other devices by the transmitter 212 and the receiver 214. The processor 220 performs various processing processes on signals to be transmitted and then transmits the processed signals to the transmitter 212 and performs processing on the signals received by the receiver 214. As necessary, the processor 220 may store information contained in exchanged message in the memory 230. Based on this structure, the eNB 200 can perform various methods according to the aforementioned embodiments of the present invention.

The processors 120 and 220 of the UE 100 and the eNB 200 requests (e.g., controls, manipulates, manages, etc.) operations of the UE 100 and the eNB 200, respectively. The processors 120 and 220 may be connected to the memories 130 and 230 for storing program codes and data, respectively. The memories 130 and 230 may be connected to the processors 120 and 220 to stores operating system (OS), an application, and general files.

The processors 120 and 220 according to the present invention can also be called a controller, a microcontroller, a microprocessor, a microcomputer, etc. The processors 120 and 220 may be embodied in the form of hardware, firmware, software, or a combination thereof. When an embodiment of the present invention is embodied using hardware, the processors 120 and 220 may include application specific integrated circuits (ASICs), digital signal processors (DSPs), digital signal processing devices. (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

The embodiments of the present invention may have the following advantageous effects.

First, in a heterogeneous cell deployment, dual connectivity with an adjacent cell to a UE may be configured to remove influence of interference due to a relation with the adjacent cell.

Second, in the heterogeneous cell deployment, influence of a DL interference signal received from the adjacent cell by the UE and influence of a UL interference signal transmitted to the adjacent cell from the UE can be reduced.

Third, dual connectivity can be configured by the UE as well as an eNB. Thus, even if a communication system deployment and a network situation are changed, reliable dual connectivity configuration may be possible.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of configuring dual connectivity to a user equipment (UE) by a macro cell in a heterogeneous cell deployment in which a macro cell and a small cell coexist, the method comprising:
    determining to configure a dual connectivity with the macro cell and the small cell for a UE connected to the macro cell, based on a measurement result for the small cell;
    transmitting, to the small cell, a dual connectivity request message for requesting a connection with the UE, wherein the dual connectivity request message comprises information of an evolved universal terrestrial radio access network (E-UTRAN) radio access bearer (E-RAB) parameter;
    receiving a dual connectivity response message indicating that the small cell has determined to connect to the UE and allocate a resource to the UE, from the small cell; and
    transmitting, to the UE, an RRC configuration message for requesting an addition of a connection with the small cell while maintaining a connection with the macro cell,
    wherein the dual connectivity request message includes information indicating a first resource that the small cell should avoid when scheduling the UE and information indicating a second resource that the small cell can allocate when scheduling the UE,
    wherein the first resource and the second resource are defined in units of a physical resource block (PRB), and
    wherein the first resource is determined by considering another UE having a dual connectivity to the macro cell and the small cell.

2. The method according to claim 1, further comprising transmitting a dual connectivity complete message for requesting establishment of a data radio bearer (DRB) with the UE when the UE completes synchronization with the small cell, to the small cell.

3. The method according to claim 1, further comprising transmitting a path switch request message for requesting modification of a bearer to the UE to a mobility Management entity (MME) for supporting the small cell according to switching of a user plane (U-plane) of the UE when the UE completes synchronization with the small cell.

4. The method according to claim 3, wherein:
    the path switching request message is transmitted to a serving gateway (S-GW) from the MME; and
    the S-GW establishes an S1 downlink bearer with the small cell.

5. The method according to claim 1, wherein a user plane (U-plane) of the UE is switched to the small cell from the macro cell or is newly generated according to a relation with the small cell when the dual connectivity is configured to the UE.

6. The method according to claim 1, wherein the measurement result is obtained based on at least one of intensity of a signal received from the small cell, reference signal received power (RSRP), reference signal received quality (RSRQ), and a signal to interference plus noise ratio (SINR).

7. The method according to claim 1, wherein the information about the first resource is information about a resource allocated to another UE having dual connectivity to the macro cell and the small cell by the small cell.

8. The method according to claim 1, wherein the dual connectivity request message comprises a dedicated preamble that the UE is supposed to transmission to the small cell, and an indicator indicating switching of the U-plane.

9. A macro cell eNB for configuring dual connectivity to a user equipment (UE) in a heterogeneous cell deployment in which a macro cell and a small cell coexist, the macro cell eNB comprising;
    a transmitter;
    a receiver; and
    a processor connected to the transmitter and the receiver to configure dual connectivity to the UE,
    wherein the processor is configured to:
        determine to configure a dual connectivity with the macro cell and the small cell for a UE connected to the macro cell, based on a measurement result for the small cell,
        control the transmitter to transmit to the small cell a dual connectivity request message for requesting a connection with the UE, wherein the dual connectivity request message comprises information of an evolved universal terrestrial radio access network (E-UTRAN) radio access bearer (E-RAB) parameter, control the receiver to receive a dual connectivity response message indicating that the small cell has determined to connect to the UE and allocate a resource to the UE, from the small cell, and control the transmitter to transmit an RRC configuration message for requesting an addition of a connection with the small cell while maintaining a connection with the macro cell, to the UE, wherein the dual connectivity request message includes information indicating a first resource that the small cell should avoid when scheduling the UE and information indicating a second resource that the small cell can allocate when scheduling the UE, wherein the first resource and the second resource are defined in units of a physical resource block (PRB), and wherein the first resource is determined by considering another UE having a dual connectivity to the macro cell and the small cell.

10. The macro cell eNB according to claim 9, wherein the processor controls the transmitter to transmit a dual connectivity complete message for requesting establishment of a data radio bearer (DRB) with the UE when the UE completes synchronization with the small cell, to the small cell.

11. The macro cell eNB according to claim 9, wherein the processor controls the transmitter to transmit a path switch request message for requesting modification of a bearer to the UE to a mobility management entity (MME) for supporting the small cell according to switching of a user plane (U-plane) of the UE when the UE completes synchronization with the small cell.

12. The macro cell eNB according to claim 11, Wherein:
the path switching request message is transmitted to a serving gateway (S-GW) from the MME; and
the S-GW establishes an S1 downlink bearer with the small cell.

13. The macro cell, eNB according to claim 9, wherein a user plane (U-plane) of the UE is switched to the small cell from the macro cell or is newly generated according to a relation with the small cell when the dual connectivity is configured to the UE.

14. The macro cell eNB according to claim 9, wherein the measurement result is obtained based on at least one of intensity of a signal received from the small cell, reference signal received power (RSRP), reference signal received quality (RSRQ), and a signal to interference plus noise ratio (SINR).

15. The macro cell eNB according to claim 9, wherein the information about the first resource is information about a resource allocated to another UE having dual connectivity to the macro cell and the small cell by the small cell.

16. The macro cell eNB according to claim 9, wherein the dual connectivity request message comprises a dedicated preamble that the UE is supposed to transmission to the small cell, and an indicator indicating switching of the U-plane.

* * * * *